United States Patent [19]
Young

[11] 3,715,682
[45] Feb. 6, 1973

[54] RECTANGULAR DISC LASER

[75] Inventor: Charles Gilbert Young, Storrs, Conn.

[73] Assignee: American Optical Corporation, Southbridge, Mass.

[22] Filed: March 19, 1970

[21] Appl. No.: 20,946

[52] U.S. Cl. ............................................. 331/94.5 P
[51] Int. Cl. ................................................ H01s 3/00
[58] Field of Search ..................................... 331/94.5

[56] References Cited

UNITED STATES PATENTS

| | | | |
|---|---|---|---|
| 3,487,330 | 12/1969 | Gudemundsen | 331/94.5 |
| 3,311,846 | 3/1967 | Simpson et al. | 331/94.5 |
| 3,611,190 | 10/1971 | Keefe, Jr. | 331/94.5 |

*Primary Examiner*—Ronald L. Wibert
*Assistant Examiner*—Conrad Clark
*Attorney*—William C. Nealon, Noble S. Williams and Robert J. Bird

[57] ABSTRACT

A rectangular-disc laser structure of all-glass support construction. A segmented neodymium-doped glass laser rod is supported in a glass tubing and is designed to permit fluid coolant flow within the tubing and amongst the rod segments. The non-laserable glass supporting means consists of samarium-doped cladding glass to reduce interference by "off axis" spontaneously emitted light. The fluid coolant has an index of refraction which matches that of the laser glass to achieve a high efficiency. The absence of metallic supporting means minimizes the chance of metallic decomposition under the influence of pump light.

9 Claims, 3 Drawing Figures

INVENTOR.
CHARLES G. YOUNG

BY William C. _____
ATTORNEY

RECTANGULAR DISC LASER

BACKGROUND OF THE INVENTION

This invention relates to glass lasers and, more particularly, to an all-glass rectangular-disc laser.

A laser (light amplification by stimulated emission of radiation) is a well-known device consisting of a rod of lasering material between parallel, end mirrors, one of which provides full reflection and the other partial reflection and partial transmission of light therethrough. Pump light is introduced into the laser material, generally normal to the longitudinal axis of the rod between the two end mirrors. The laser light energy is produced in the laser rod by photonic emission from active or high energy level ions in the body of the laser material, with the pump light increasing the number of ions from lower energy level to the upper energy level. The pumping light energy abnormally increases the upper level population of ions and concomitantly depletes the lower level population of ions creating an inversion of energy states. Some of the ions in the upper energy level undergo a spontaneous light emissive transmission to the lower level, and a portion of the spontaneously emissive light reflects back and forth between the mirrored surfaces stimulating similar light emissive transmissions from other upper level ions. As the stimulated emission reflects back and forth repeatedly through the rod a sufficiently high intensive pulse of laser light energy is emitted for transmission through the partially reflective surface.

There are various problems associated with producing a laser beam. The amount of pumping illumination required to produce laser action in neodymium glass is about 50 watts per cubic centimeter. This pumping light produces heat in the lasering material, as does operation at high repetition rates. Special precautions must be taken for removing this heat. It is known in the art that temperature rises in the lasering material of glass must be kept uniform to within about 1°C. or less in order for the Fabry-Perot cavity amplification to take place without loss of efficiency.

When operating solid glass laser rods at high repetition rates two problems appear. First, the rod may exhibit a planar radial split or break when the surface tangential stress exceeds the tensile limit of the glass. The second problem area is that of change in index of refraction with temperature, and in the case of a cylindrical glass laser rod a strong positive lens effect under moderate average-power operating conditions.

For example, the changes in temperature in a non-segmented laser rod cause an unequal index of refraction radially in the rod because of the linear expansion of the material. These temperature changes together with the change of index of refraction with temperature at constant density, and stress-induced birefringence, produce an induced lens effect in the rod which is deleterious.

To solve the problems related to excessive heat in the solid laser rod, an initial approach to a solution was a longitudinal sectioning which yielded a bundle or fagot of small-diameter cylindrical laser rods. This approach allowed a considerable improvement in the attainable average power in the so-called long-pulse mode of operation, since self-focusing does not occur in this mode.

In the so-called Q-switched mode, however, thermal lensing is still a problem as well as damage at the output end edges of the rods. In addition, aligning the plurality of rods is difficult.

A better approach to the problem and that used in the present invention is to form a disc laser wherein the cylindric rod is sectioned transversely into a number of discs. There are a number of advantages in doing this. First, the minimum dimension of each piece can be made small enough to eliminate thermal splitting. Second, the thermal gradient is now parallel rather than transverse to the laser beam so that thermal lensing is much reduced. Third, even for a given residual radial thermal gradient, and this can be further minimized by use of an edge cladding, the induced lens power is about an order of magnitude less than that for a rod. Fourth, the full aperture is usable, compared to the case of the fagot laser where such is not true, with no rod edges in the laser beam. Fifth, optical correction can be applied to each disc, if needed. Sixth, discs can be selected for their durability and composition as a function of axial position. And finally, alignment problems are equivalent to those for a single rod and therefore simpler than for a fagot array.

As further background of this particular laser rod art I make reference to the segmented lasers of the type disclosed in my copending applications "DIsc Laser Modification," Ser. No. 812,119 filed on Apr. 1, 1969, and which has matured into U.S. Pat. No. 3,602,836 and "Disc Laser Variation", Ser. No. 809,641 filed on March 24, 1969 and which has matured into U.S. Pat. No. 3,621,456 assigned to the same assignee as that of the present invention.

The disc laser approach, however, has been found to have some limitations. Since the laser light passes through a considerable length of the cooling fluid, this fluid must be transparent and remain so during prolonged operation. In addition, inter-facial optical losses between the fluid and the discs should be no more than for a solid rod. Also, appropriate mounting means must be employed which will not comprise laser efficiency, robustness, reliability, etc.

One of the problems involved with disc lasers, and which my invention solves, is the efficiency loss resulting from support-metal decomposition under the influence of pump light. Pump light, for example, from a Xenon flash tube, is intense energy. This light will vaporize the metal which then condenses on relatively cooler objects in the vicinity. Metal deposition on the laser glass, flash tube reflectors and other internal parts decrease pumping efficiency, lasing efficiency, laser life, fluid transparency, and may cause blockage of coolant flow, and other problems.

A solution to the decomposition problem is to eliminate all metal parts which may come under the influence of pump light. This includes metal support or mounting devices holding individual discs. My invention provides means for supporting the discs in an all-glass construction. The glass is transparent to pump light and chemically inert to the chosen coolant. Properly selected glass does not decompose under the influence of pump light. My support arrangement does not comprise pumping efficiency, lasing efficiency, life or coolant flow.

Therefore, it is an object of my invention to provide an improved disc-laser structure.

An additional object of my invention is to provide a disc laser structure not subject to metal decomposition under the influence of pump light.

Brief Description of The Invention

My invention relates to means for mounting discs of laser glass to form a laser device. The laser glass disc is circumferentially encompassed by a cladding glass, the periphery of which is rectangularly shaped. This assembly of the two types of glass is termed a "plate" hereafter. One corner of the cladding glass contains an aperture, and the two corners adjacent thereto contain glass protuberances used for spacing between a first plate and an adjacent one. The aperture is a conduit for coolant flow across faces of the discs in response to pumping and cooling means external to the laser device.

The rectangular plates are held close-fitted within a glass rectangular tube. The tube is arranged to precisely align the plates along a common longitudinal axis. The plates have sufficient thickness to permit alignment by the tube. The plate orientation within the tube is such that adjacent plates have their apertures in diagonally opposite corners to provide a coolant flow path across the surface of each plate. Thus coolant flow is along a tortuous and generally unulating path. The coolant fluid is selected to have an index of refraction equal to that of the selected laser glass, for example, with neodymium-doped glass equal to 1.51 for optimum operation.

Flash tubes used to supply the pump light are approximately parallel to the outside wall of the rectangular glass tubing and therefore separated by the tubing wall thickness from the active laser medium. In like manner, a close-wrap coupling reflector is parallel to the outer wall of the tubing; two or four flash tubes may be arranged about the rectangular tube.

It is to be understood that other laser materials can be utilized. Laser glass of dopants other than neodymium and coated laser glass can be employed.

It is to be further understood that the plates need not necessarily be aligned to form right angles with the longitudinal axis. For example, they could be aligned at the "Brewster's angle".

DRAWINGS

DETAILED DESCRIPTION

Figure 1:
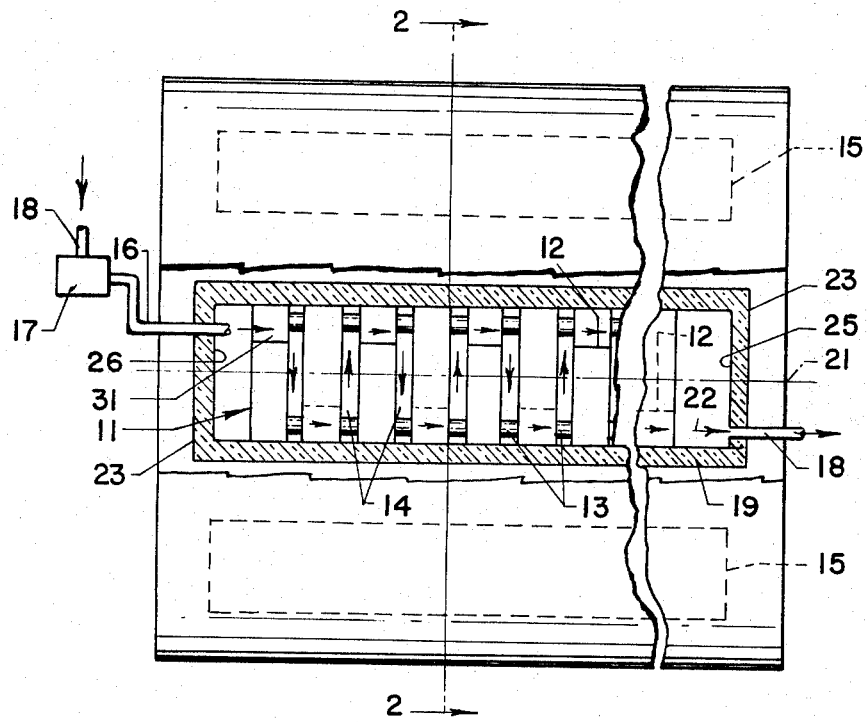
FIG. 1 is a side elevation in partial section, partially broken away of the preferred embodiment of my present invention viewed perpendicularly to the longitudinal axis.

FIG. 1 is of the preferred embodiment of my invention. Glass laser plates 11 are aligned along longitudinal axis 21 by rectangular glass tubing 19 into which plates 11 are inserted in a close tolerance fit. Glass spacers 13 are raised from the surfaces of plates 11 along a longitudinal direction. The spacers abut adjacent plates 11 and thereby provide a space for coolant flow 22 between plates. Coolant flow 22 is controlled by a pump 17. Flow enters segmented laser device 23 via orifice 16 and exits via orifice 18 back to pump 17.

Details of the pump and associated cooling equipment are shown schematically herein to maintain drawing simplicity. More detailed information may be found in copending Booth application Ser. No. 821,165 filed on Apr. 25, 1969 and which has matured into U.S. Pat. No. 3,569,860. The flow 22 within laser device 23 takes an undulating path through apertures 12 and spaces 14, to provide efficient cooling of plates 11. The fluid is chosen to have an index of refraction of approximately 1.51 to match that of the preferred approximately 2.4 percent by weight $Nd^{+++}$ doped laser glass for maximum efficiency. For the samarium glass I prefer approximately 10 percent by weight dopant. For further information regarding the samarium and neodymium glasses useable according to this invention, I make reference to U.S. Pat. No. 3,445,785 to Koester et al assigned to the same assignee as that of the present invention.

Flash tubes 15 are parallel to the outer wall of glass tubing 19 and although only two flash tubes are shown, more may be used. The flash tubes 15 provide the necessary excitation energy to the laserable material. The lasering action takes place in a direction parallel to longitudinal axis 21. The two ends of the laser rod contain parallel mirrored surfaces 25 and 26, both mirrors being orthogonal to the longitudinal axis; one surface is completely reflective and the other is partly reflective and partly transmissive to allow the exiting of the laser beam. As is well understood, the mirrors reflect light energy back and forth through the laser structure to promote light amplification.

Figure 2:
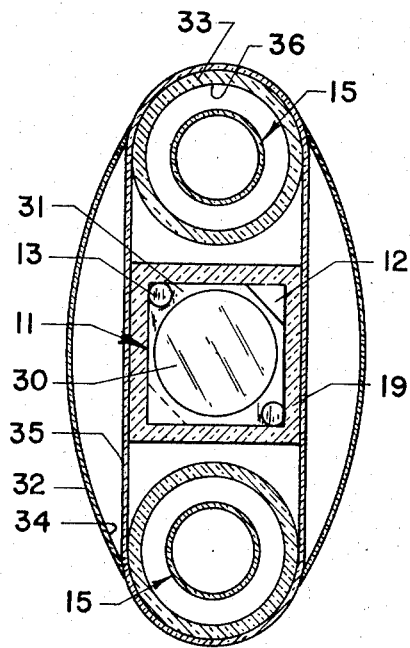
FIG. 2 is a cross-sectional view of the arrangement of FIG. 1 taken along the line 2—2.

Laser disc 30 can be seen in FIG. 2 as a circle. The encompassing and supporting glass ring 31 is of samarium-doped glass. It absorbs any off-axis light rays which could interfere with the laser beam. An aperture 12 is formed through glass ring 31. Glass spacers 13 are shown in corners adjacent to the corner through which aperture 12 is formed. Water-cooled reflector 35 is provided which combined with wall 32 forms a conduit 34 for water coolant (not shown). Ultraviolet light absorbing glass flash tube water jacket 33 is provided which combines with the surface of the flash tube to form another conduit 36 for water coolant (not shown).

It is seen that glass support construction is used throughout. No metal parts are used internal to the glass tubing 19.

Figure 3:
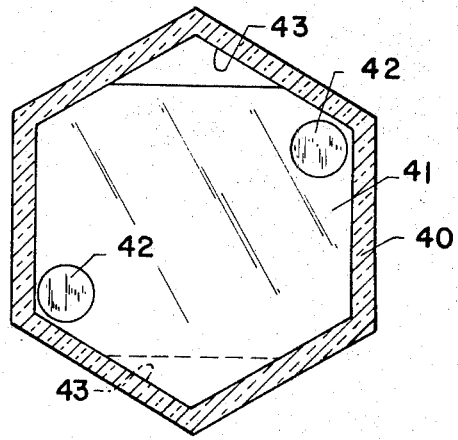
FIG. 3 is a view of an alternative embodiment.

FIG. 3 is a view of an alternative embodiment of my present invention. Glass tubing 40 is hexagonal in cross-section and is composed of samarium-doped cladding glass. The tubing 40 serves two purposed herein: to absorb any off-axis light; and to channel the coolant flow. The hexagonal cross-section permits usage of a maximum of six flash tubes. Plate 41 is the laser material. Spacers 42 are also provided. It should be understood other polygonal and non-polygonal shapes may be used for tubings, if compatible plate cross-sections are used.

In FIG. 1, tubing 19 is shown separate and distinct from cladding glass ring 31. It should be understood that tubing 19 and ring 31 can both be of samarium-doped glass or can be formed as one continuous structure of samarium-doped glass.

Aperture 43 is formed through one corner as shown to provide a path for coolant flow between hexagonal plates. The next adjacent apertures 43 need not be 180° angularly displaced from each other. In this case, they could be 60° or 120° angularly displaced, for example. The ultimate criterion is tortuous but laminar coolant flow.

It should be understood that in any of the embodiments of my invention herein described and referred to, the aperture formed in the ring can be located at an edge or a corner of the ring; or the aperture can be formed within the ring and displaced from an edge or corner thereof so as to be bounded entirely by ring material. However, the edge-placed or corner-placed apertures are more desirable than a non-peripheral aperture since the laser beam is not influenced thereby.

It should be understood that ring structure 31 could be discontinuous. If one or more spaced points on the periphery of a disc 30 were contiguous to at least one inside wall of tubing 19, structure 31 could be a non-continuous ring. From FIG. 2, it can be seen that disc 30 can be increased in diameter. Accordingly, the periphery of disc 30 can tangentially intersect all four inside walls of tubing 19, and ring structure 31 comprises four arcuate segments of generally triangular cross-section.

From the embodiments of my invention disclosed herein, it is understood that other changes can be made without departing from the spirit and scope of the invention as defined by the appended claims.

I claim:

1. In an improved laser structure including linear glass tubing arranged to contain flow of a fluid, a segmented laser rod supported in said tubing, and laser pump means externally adjacent to said tubing for providing light energization to said laser rod, the improvement comprising said rod including a plurality of glass laser plates, each of said plates close fitted within said tubing and arranged to substantially span the hollow of said tubing, there being an aperture near an edge of each plate, said plates being substantially equally spaced from each other, sequential plate apertures arranged to cause oppositely directed flow of said fluid across the two faces of each of said plates to efficiently cool each of said plates, and said structure being constructed entirely of glass.

2. A laser structure as recited in claim 1 wherein each of said plates comprises a disc of laser glass and an apertured glass ring encompassing and supporting said disc within said tubing.

3. A laser structure as recited in claim 2 wherein both said glass ring and tubing are polygonal in cross-section.

4. A laser structure as recited in claim 2 wherein said disc of laser glass is of neodymium-doped glass.

5. A laser structure as recited in claim 3 wherein said ring is of samarium-doped glass.

6. A laser structure as recited in claim 1 wherein said tubing is of samarium-doped glass.

7. A laser structure as recited in claim 1 wherein said fluid is a liquid with an index of refraction of approximately 1.51.

8. A laser structure as recited in claim 2 wherein said ring is rectangular, and having a corner cut to permit flow of said fluid between opposite faces of each plate, there being glass spacers formed at corners adjacent said cut, said spacers arranged to provide uniform spacing between said plates, said plates supported in and aligned by said glass tubing along a common longitudinal axis.

9. A laser structure as recited in claim 1 wherein each of said plates comprises a disc of laser glass and glass structure supporting said disc within said tubing.

* * * * *